United States Patent [19]
Gupta et al.

[11] Patent Number: 5,389,145
[45] Date of Patent: Feb. 14, 1995

[54] CEMENT MIXING SYSTEM

[75] Inventors: D. V. Satyanarayana Gupta; Marek K. Pakulski, both of The Woodlands; William C. Pumphrey, Spring, all of Tex.

[73] Assignee: The Western Company of North America, Houston, Tex.

[21] Appl. No.: 174,786

[22] Filed: Dec. 29, 1993

[51] Int. Cl.$^6$ .................................................. C04B 24/00
[52] U.S. Cl. ...................... 106/807; 106/724; 106/802; 106/823
[58] Field of Search ............... 106/724, 802, 807, 823; 166/285, 293, 294; 405/266, 267; 252/8.551

[56] References Cited

U.S. PATENT DOCUMENTS

| | | | |
|---|---|---|---|
| 27,271 | 1/1872 | Harnsberger et al. | 166/276 |
| 2,776,713 | 1/1957 | Morgan et al. | 166/22 |
| 2,800,963 | 7/1957 | Roberts et al. | 166/22 |
| 2,806,531 | 9/1957 | Morgan et al. | 166/29 |
| 2,887,159 | 5/1959 | Harley et al. | 166/29 |
| 3,022,824 | 2/1962 | Binkley et al. | 166/31 |
| 3,242,986 | 3/1966 | Hower | 166/31 |
| 3,429,373 | 2/1969 | Harnsberger et al. | 166/276 |
| 3,862,663 | 1/1975 | Curtice et al. | 166/276 |
| 3,955,993 | 5/1976 | Curtice et al. | 106/807 |
| 4,654,802 | 3/1987 | Davis | 364/502 |
| 5,027,267 | 6/1991 | Pitts et al. | 364/172 |
| 5,103,908 | 4/1992 | Allen | 166/285 |
| 5,151,131 | 9/1992 | Burkhalter et al. | 106/807 |
| 5,181,568 | 1/1993 | McKown et al. | 166/293 |
| 5,221,344 | 6/1993 | Prevedello et al. | 106/807 |
| 5,238,064 | 8/1993 | Dahl et al. | 166/285 |

FOREIGN PATENT DOCUMENTS

0315243A1 10/1989 European Pat. Off. .

Primary Examiner—Mark L. Bell
Assistant Examiner—Michael Marcheschi
Attorney, Agent, or Firm—Peter A. Bielinski

[57] ABSTRACT

A method for mixing cement with water is provided. Dry cement is first slurried in oil. The slurry is easily metered and mixed with water to obtain a cement-/water/oil slurry having the desired density. Cement-/water/oil slurries thus produced can be used in all applications and have properties, when cured, comparable to cements not containing oil. The method allows precision metering of the cement and therefore precision control over the density of the final cement slurry.

10 Claims, No Drawings

CEMENT MIXING SYSTEM

BACKGROUND OF THE INVENTION

1. Field of the Invention

The present invention relates to a method for accurately mixing dry cement with water to form a cement slurry having a desired density.

2. Description of the Prior Art

In tile past, cement slurries have been continuously produced by mixing accurately metered water and dry powdered cement. The water is easily metered by, for example, a valve and a flowmeter. The dry cement is very difficult to meter and is metered by, for example, allowing fluidized cement to flow from a pressurized surge can through a knife gate or butterfly valve. The water and dry cement flow into a mixing means to yield a cement/water slurry.

Many cement job failures are caused by a lack of adequate, steady delivery of bulk cement to the cementing unit during the job. The job failures caused by flow interruptions, plugging of tools by chunks of set cement, and erratic flow result in poor primary cement jobs, many of which require remedial cementing jobs. A better-controlled flow of dry cement would help prevent this type of failure, thereby reducing the number of remedial cement operations.

The use of recirculating cement units equipped with automatic density control systems has drawn attention to pneumatic bulk supply systems. The automatic density control system puts out a post-job record showing cement density throughout the job and shows when flow has been interrupted or becomes erratic.

On rigs having a history of erratic cement delivery, pressurized separator tanks are often included in bulk delivery systems to provide a steady flow of dry cement. A nonpressurized version of the separator can be used to feed (by gravity) a cement hopper for jet mixing systems.

Many methods have been developed to accurately meter the dry powdered cement. However, at best, the flow of dry cement into the mixer is variable and consequently the cement/water slurry produced has a variable density. Additional steps, e.g., averaging tanks must be used to obtain a cement/water slurry having a constant density.

A cement mixing method which can accurately and continuously produce a cement/water slurry would produce better quality cement, eliminate the need for averaging tanks and greatly reduce the amount of waste cement/water slurry generated at job sites.

The continuously produced cement/water slurry must have a desired density and must have a minimum degree of variation in density, preferably ±0.1 pounds of cement per gallon or less.

SUMMARY OF THE INVENTION

It is an object of this invention to provide a method which can continuously produce a cement/water slurry having a constant density.

It is another object of this invention to provide a method which can produce cured concrete having a high compressive strength.

These objects are attained by a method which comprises mixing cement and oil to form a cement/oil slurry, accurately metering the cement/oil slurry and water into mixing means to form a cement/water/oil slurry which will cure to form a high quality constant density cement.

DESCRIPTION OF THE INVENTION

The present invention relates to a method for producing a constant density cement/water slurry. The method uses a cement/oil slurry instead of dry bulk cement. The cement/oil slurry can be handled as a liquid, has good flow properties, does not settle out during transport or storage and mixes easily with water. The cement/oil slurry can be accurately metered and with the addition of water in a continuous mixing process produces a cement/water/oil slurry having a constant density. The oil used to produce the cement/oil slurry does not significantly affect the quality of the cured cement so produced.

In accordance with the present invention, a non-aqueous cement slurry is prepared by mixing, as the essential ingredients, Portland cement, a hydrocarbon liquid, and a surface active agent which is miscible with hydrocarbons and either soluble or dispersible in hydrocarbons. This non-aqueous cement slurry can then be mixed with water to form a settable slurry.

The composition may suitably include a hydrocarbon liquid which may be a mixture of hydrocarbons. The liquid hydrocarbon may be a crude petroleum or it may be a fraction of crude petroleum, such as gasoline, kerosene, gas oil or diesel oil. The hydrocarbon liquid may also be a non-toxic mineral oil or vegetable oil or the like. Preferably the hydrocarbon is a fuel oil such as kerosene or diesel oil or it may be desirable to use crude petroleum, such as is found in adjacent oil wells in the field where the cementing operation may be conducted.

The hydrocarbon liquid selected for making the non-aqueous cement slurry should be as free from water as possible so as to keep the cement particles dry. Some diesel fuels contain as much as 15% water. Although it is possible to use high water content hydrocarbons, these should be avoided. Usually kerosene and diesel fuels contain less than 1% water are recommended for use in the cement/oil slurry. Crude oil can be used, but must be tested to insure that it does not interfere with the action of the surface active agent. If crude oil is used it should have an API gravity of 30 degrees or more, be untreated, and be as free from water as possible.

The liquid hydrocarbon as described may be employed in an amount sufficient to form a pumpable slurry with the cement and surfactant. The amount of hydrocarbon liquid, depending on its viscosity, may range from about 20 cc. to about 200 cc. per 100 grams of dry cement. A preferred amount is in the range from about 25 cc. to about 150 cc. per 100 grams of the dry cement. The liquid hydrocarbon may have a suitable viscosity to provide a pumpable slurry; the viscosity may vary over a wide range and may be as high as about 300 centipoises at 100° F. The oil or hydrocarbon should remain liquid under conditions of use.

Any surface active agent can be used in the present invention as long as it causes the oil to accept more cement as a dispersion, keeps the dispersed cement particles suspended in the oil for several hours, and permits water to penetrate the slurry under little or no outside pressure. One or more surfactants may be used.

The miscible surface active agent should be hydrocarbon soluble or hydrocarbon dispersible. The amount of surface active agent used is an amount sufficient to disperse and wet the cement and should be present at between 0.01% and 10% preferably between 0.1% and 2.5% by weight of the oil.

Anionic compounds may not be satisfactory by themselves. Best results have been with cationic and nonionic surfactants. Preferable surfactants are as follows:

Cationic—Compounds containing nitrogen such as substituted oxazolines, substituted glyoxalidines, tertiary amines, polyethoxy amines and quaternary ammonium compounds.

Nonionic—Polyoxyethylene esters, polyoxyethylene thioethers, polyoxyethylene addition compounds, alkyl phenoxy polyoxyethylene derivatives and imidazoline derivitives.

The addition of certain fatty acids and the like to the above can enhance the desirable properties of the surfactant and can be included. For example: A mixture of an alkyl phenoxy polyoxyethylene derivative and a mixture of fatty acids that contains oleic acid gives satisfactory results.

By using a surface active agent with the oil to make a cement/oil slurry, it has been found that a cement/oil slurry of very high density which has good pumping characteristics can be produced. It also has been found that the cement when finally set is hard and of low permeability.

A rather surprising feature of the composition is the relatively small amount of oil used. This is desirable because high oil loading may affect the cement quality.

The cement/oil slurry can be accurately metered into conventional mixing means along with accurately metered water to form a constant density cement/water/oil slurry. A second or additional surfactant may be added with the water to facilitate hydration of the cement particles. The second surfactant may be the same as the first surfactant but preferably is a surfactant which optimizes the water wettability of the cement particles. The second surfactant may be, for example, an ethoxylated alkylphenol with sufficient ethyleneoxide units to achieve a hydrophillic/lipophillic balance number of greater than eight. A suspending agent such as organophilic clay may be added to stabilize the slurry. Other ingredients known in the cement art may be added to the slurries of the present invention.

Sand, bentonite, ground volcanic ash containing some pumice, and other ingredients may be added to the slurries of the present invention. Sand is inert and should not affect the cement. However, bentonite may absorb the surfactant and reduce its dispersing action.

Final cement/water/oil slurry densities of higher than 14 pounds per gallon have been achieved.

The cement/oil slurry may be made up using any cement mixing means, e.g., an ordinary jet mixer such as is employed in making cement/water slurries. The slurry, when properly mixed, bellaves, while being pumped, much the same as a cement/water slurry except that it has no gel-like characteristics. Certain precautions should be taken, however, the most important of which is to insure against contamination with water. Mixing lines and pumps must be water free.

The cement/oil slurry can be prepared at a remote location and transported as a liquid to the job site. The slurry can also be stored for extended periods of time. Periodic agitation may be necessary in some cases to prevent settling.

The cement/oil slurry employed in tile present invention may contain hydratable cement in an amount from about 50% to about 95% by weight of the slurry, preferably about 70% to about 90% by weight; liquid hydrocarbon in an amount from about 4% to about 50% by weight of slurry, preferably about 10% to about 30% by weight, and surfactant in an amount from about 0.01% to about 10% by weight of the slurry.

Experimental cement/oil slurries tested in the laboratory have led to the following recommended proportions:

| Diesel oil | 100 cc |
|---|---|
| Surface active agent | 1.5 cc |
| Portland cement | 400 grams |
| Suspending agent | 3.5 grams |

In commercial operations in the field, the following proportions have been used and are recommended:

| Diesel oil | 400 gallons |
|---|---|
| Surface active agent | 6 gallons |
| Portland cement | 142 sacks |
| Suspending agent | 117 pounds |

The ingredients must be intimately mixed. An intimately mixed cement/oil slurry should have a viscosity of 15 to 20 poises, so that it is readily pumped. It is not thixotropic. It sets, when it comes in contact with water, into a very dense mass having a compressive strength of up to 1600 pounds per square inch.

The following examples are given for the purpose of illustration. The invention is not to be construed as limited by these examples.

EXAMPLES

The following examples used API Class H cement, diesel oil, a imidazoline derivative surfactant, an organophillic clay suspending agent and an ethoxylated alkylphenol cement wetting agent to form cement/oil slurries. The surfactant used was AQUET MA 854 TM, an imidazoline derivative available from Aquaness Chemicals, Houston, Tex. The suspending agent was CLAYTONE IMG-400 TM in a methanol slurry available from Southern Clay Products Inc, Gonzales, Tex. The cement wetting agent was TRITON X-100 TM available from Union Carbide Corporation, Danbury, Conn. The cement/oil slurries for the examples were prepared in a Waring Blender. The surfactant was dissolved in diesel oil and agitated for 30 seconds. The cement was added slowly with agitation. The slurry was agitated an additional 30 seconds or until the slurry reached a minimum viscosity.

Cement/water/oil slurries were prepared by weighing 600 grains of the cement/oil slurry into a 1000 ml breaker. The slurry was stirred with a countertop stirrer for one minute at 1300 RPM. The indicated amount of water was slowly added until a uniform mixture was obtained. The cement/water/oil mixture was then transferred to a Warring blender cup and mixed according to API Specification 10A Section 5. All rheologies were run on a rotational viscometer at room temperature. Compressive strength tests were conducted in a preheated 100° F. water bath at atmospheric pressure. Tests used 2 inch×2 inch blocks tested at 24 and 72 hours. Concentrations are in weight percent of the slurry.

Example 1

A cement/diesel slurry was prepared using the following ingredients:

| | |
|---|---|
| Diesel oil | 40% wt |
| Suspending agent | 0.7% wt |
| Cement | 59% wt |
| Surfactant | 0.2% wt |
| Cement wetting agent | 0.1% wt |

This slurry was mixed with 38% by weight tap water to produce a 10.9 pound per gallon cement/water/oil slurry. The viscosity at room temperature was 63-41-31-21-8-7 centipoises at 600-300-200-100-6-3 RPM on a FANN 35 ™ Rheometer as described in the API procedure (Appendix H). The cured cement had a compressive strength of 75 psi at 24 hours and 150 psi at 72 hours and showed a good even set.

Examples 2-4 used a cement/diesel oil slurry prepared as follows:

| | |
|---|---|
| Diesel oil | 17% wt |
| Suspending agent | 0.7% wt |
| Cement | 82% wt |
| Surfactant | 0.2% wt |
| Cement wetting agent | 0.1% wt |

Example 2

The cement/diesel oil slurry was mixed with 26.5% by weight tap water to produce a 13.79 pound per gallon cement/water/oil slurry. The viscosity at room temperature was 87-57-45-28-10-8 at 600-300-200-100-6-3 RPM. The cured a compressive strength of 455 psi at 24 hours and 805 psi at 72 hours and showed a good even set.

Example 3

The cement/diesel slurry was mixed with 23% by weight tap water to produce a 14.04 pound per gallon cement/water/oil slurry. The viscosity at room temperature was 102-64-58-41-11-8 at 600-300-200-100-6-3 RPM. The cured cement had a compressive strength of 723 psi at 24 hours and 1185 psi at 72 hours and showed a good even set.

Example 4

The cement/diesel slurry was mixed with 22.13% by weight tap water to produce a 14.14 pound per gallon cement/water/oil slurry. The viscosity at room temperature was 110-68-60-42-11-9 at 600-300-200-100-6-3 RPM. The cured cement had a compressive strength of 1035 psi at 24 hours and 1590 psi at 72 hours and showed a good even set.

From the above examples, it can be seen that cement/water/oil slurries cure to form cement with desirable properties. The oil content does not significantly affect the cement quality. By using the pumpable cement/oil slurries instead of dry bulk cement, cement/water/oil slurries can be produced which have a constant density. Cement job failures due to variable uncontrollable cement density can be essentially eliminated. In addition, the amount of waste cement produced at a job site can be greatly reduced since averaging tanks are minimized or eliminated.

While preferred embodiments of the invention have been described herein, changes or modifications can be made in the method by an individual skill in the art without departing from the spirit or the scope of the invention as set forth in appended claims.

What is claimed:

1. A method for continuously producing a settable cement/water/hydrocarbon liquid slurry comprising mixing dry powdered cement with a hydrocarbon liquid to produce a pumpable cement/hydrocarbon liquid slurry, accurately metering said cement/hydrocarbon liquid slurry and water into mixing means, mixing the cement/hydrocarbon liquid slurry with the water to form a settable cement/water/hydrocarbon liquid slurry.

2. The method of claim 1 wherein the cement/hydrocarbon liquid slurry contains between about 50% and about 95% by weight cement.

3. The method of claim 1 wherein the cement/hydrocarbon liquid slurry contains between about 70% and about 90% by weight cement.

4. The method of claim 1 wherein the cement/hydrocarbon liquid slurry comprises a surfactant.

5. The method of claim 4 wherein the surfactant is a nonionic or cationic surfactant and is present at between 0.01% and 10% by weight of the hydrocarbon liquid.

6. The method of claim 1 wherein tile hydrocarbon liquid comprises diesel oil, kerosene, crude oil, gas oil, gasoline, mineral oil or vegetable oil.

7. The method of claim 1 wherein the cement/water/hydrocarbon liquid has a density between 7 and 16 pounds per gallon.

8. The method of claim 1 wherein the cement/water/hydrocarbon liquid slurry comprises a cement wetting agent.

9. The method of claim 1 wherein the cement/hydrocarbon liquid slurry comprises a suspending agent.

10. A method for continuously mixing cement with water comprising mixing a dry powdered cement, a hydrocarbon oil, a suspending agent and a surfactant to form a homogenous, stable, pumpable cement/oil slurry, pumping said cement/oil slurry and water into mixing means to produce a settable cement/water/oil slurry.

* * * * *